United States Patent
Crawford (10) Patent No.: US 6,395,686 B2
(45) Date of Patent: *May 28, 2002

(54) HIGH PRESSURE, HIGH TEMPERATURE (HPHT) FLUID LOSS CONTROL AID FOR DRILLING FLUIDS

(76) Inventor: Donald Crawford, 126 St. Ann, Belle Chasse, LA (US) 70037

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,252
(22) Filed: Oct. 29, 1999

Related U.S. Application Data
(60) Provisional application No. 60/106,091, filed on Oct. 29, 1998.

(51) Int. Cl.[7] ............................. C09K 7/02; C09K 7/00
(52) U.S. Cl. ..................... 507/107; 507/106; 507/126; 507/140
(58) Field of Search ................................ 507/106, 107, 507/126, 140

(56) References Cited

U.S. PATENT DOCUMENTS

| | | | | |
|---|---|---|---|---|
| 5,114,597 A | * | 5/1992 | Rayborn et al. | 507/126 |
| 5,843,872 A | * | 12/1998 | Rayborn, Sr. et al. | 507/126 |
| 5,942,467 A | * | 8/1999 | Rayborn, Sr. et al. | 507/126 |

* cited by examiner

Primary Examiner—Philip Tucker
(74) Attorney, Agent, or Firm—Morgan, Lewis & Bockius LLP (57) ABSTRACT

The invention relates to a composition comprising an HPHT fluid loss control aid, stable at elevated temperatures and which also acts as an excellent shale stabilizer, bore hold lubricant, sealant for depleted sand, and wall cake conditioner. The HPHT fluid loss control aid broadly comprises a uintaite sold under the trade name Gilsonite®, which also contains a surfactant such as a nonionic surfactant. The HPHT fluid loss control aid also contains a solubilized lignite such as causticized lignite and carbon black. The fluid loss control aid reduces HPHT filtrate loss, has good stability at elevated temperatures such as at 300° F., stabilizes troublesome shales and decreases bore hole erosion, helps seal depleted sands, reduces torque and drag, causes no adverse effects on the flow properties of the properly conditioned drilling fluid, and lowers total well costs.

15 Claims, 4 Drawing Sheets

HIGH PRESSURE, HIGH TEMPERATURE (HPHT) FLUID LOSS CONTROL AID FOR DRILLING FLUIDS

RELATED APPLICATION

This application is based on provisional patent application U.S. Ser. No. 60/106,091 filed on Oct. 29, 1998.

FIELD OF INVENTION

The field of the invention comprised an additive to reduce HPHT fluid loss in drilling fluids used in drilling subterranean wells.

BACKGROUND OF THE INVENTION

Drilling fluids, sometimes referred to as drilling muds, are complex mixtures of chemicals employed in drilling subterranean wells and perform a variety of functions. These drilling fluids generally comprise a liquid or slurry pumped down the down the drill string which exits through openings in the drill bit immediately adjacent the penetrated formation. The drilling fluid then flows upwardly in the annulus between the frill string and the wall of the hole to the surface and functions in a variety of ways. The drilling fluid both cools and lubricates the drill bit and because injected into the hole under pressure delivers power to te frill bit, carries cuttings upwardly out of the drill hole during circulation, suspends cuttings in the bore hole when circulation stops, prevents blow outs, minimized water loss into permeable formations along the length of the bore hole, and acts as a lubricant between the drill string and the bore hole wall.

The simplest drilling fluid comprises a mixture of drilled solids and water, sometimes referred to as "native" drilling mud. In some instances, the solids obtained consists of clays, which when finally ground, function as the solid component of the drilling fluid or drilling mud. These drilling fluids tend to function reasonably well for controlling normal pressures at shallow depths in many oil and gas wells.

Native drilling mud or fluids provide almost no control over the loss of water into permeable formations and tend to wash out, or enlarge the diameter of the hole, and accumulate shale balls on the bit. These difficulties prompted the addition of a wide variety of chemicals to the drilling fluid.

The standard drilling fluid therefore comprises a native drilling fluid combined with clays such as bentonite, and/or sodium hydroxide, chrome, lignosulfonates, lignite, weighting materials such as barium sulfate, hematite, calcium carbonate, silica and polymeric compounds.

The bentonite, along with the drilled solids and sometimes sub-bentonitic clays or mixtures, acts as a gelling agent which minimizes or prevents cuttings from the drilling operation from settling to the bottom of the well, especially during those periods which require stopping the drilling operation to add extra sections of drill pipe to the bit to allow increasing depth of the drilled hole.

The drilling fluid also creates a filter cake that imparts low permeability to the face of the permeable formation. The ideal filter cake comprises a relatively thin and hard layer as opposed to thick viscous coatings. The latter interfere with the drilling operation in that they have a tendency to entrain drilled solids moving up the annulus of the bore hole. Pressure in the bore hole exceeds the pressure in the permeable formation and thereby creates the filter cake which further results in liquid from the drilling fluid moving into the permeable formation. This leaves a layer of the filter cake on the face of the hole. Liquid permeating this filter cake and the formation is called filtrate. Large amounts of filtrate passing across the formation face result in the deposition of a thick filter cake whereas small amounts of filtrate passing across the fade result in a thin filter cake. The thin filter cake avoids or minimizes the problem of decreasing the bore hole diameter, a cause of concern since this decreases the flow of drilling fluid upwards and out of the well, slowing down the removal of cuttings from the bore hole.

As the thickness of the filter cake increases, the volume of fluid loss also increases. The thinner the filter cake, therefore, the lower the fluid loss. A thick wall cake will lead not only to high fluid loss, but also a reduction in the diameter of the well bore.

The ideal filter cake, therefore limits filtrate loss into the formation and minimizes any decrease in bore diameter. In addition to the inconvenience of having to continually add water to the drilling fluid because of filtrate loss, drillers have also found that excessive filtrate pumped into the formation not only interferes with electric logging of the well, but also causes swelling of the permeable formation which can reduce the permeability of a productive formation to the extent that the formation will not produce oil or gas, or only provide minimal production.

The addition of various art known compounds to the drilling fluid can minimize fluid loss into the formation. Additionally, the compounds added to the wells to prevent fluid loss must withstand the temperatures in the wells, generally from about 100 to about 500° F. The art refers to materials that function in this way as HPHT fluid loss control aids. Many, however, cannot function adequately at these extreme conditions of temperature and pressure.

Bore hole temperatures can vary from ambient up to about 500° F. and pressures from atmospheric up to about 20,000 psi. Temperature and pressure conditions such as these can have an adverse effect on bore hole fluids causing them to destabilize if they contain additives and furthermore, these pressures and temperatures have a very strong effect in forcing the drilling fluid not only to the surface, but also against the side of the bore hole causing either filtrate loss or a break through of the drilling fluid, as well as the oil or gas under pressure into the permeable strata considerably below the opening of the well at the surface. Accordingly, the industry has sought ways to prevent not only the adverse effect on drilling fluid additives encountered under these conditions, but also blowouts of the well and the subsequent loss of oil, gas or other materials produced in the well, by the use of HPHT additives to the drilling mud.

In addition to reducing HPHT fluid loss or filtrate loss, HPHT fluid loss control aids would also ideally stabilize troublesome shales and decrease bore hole erosion. By inhibiting the swelling of the formation; preventing the adhesion of gumbo shale and other clays to the drill string; coating clay formations to produce a gauged hole; hole problems are prevented, which significantly reduces downtime on the rig, thereby reducing the cost of drilling the wells, e.g., oil and/or gas wells.

The HPHT fluid loss control aid would preferably provide some bore hole lubrication in order to not only decease the friction on the cutting bit during drilling operations, but also the rotation of the drill shaft in the hole as well as the insertion of a drilling pipe into the hole during the drilling operation. Stated otherwise, bore hole lubricants reduce torque and drag applied to the drill sting during drilling operations.

Since some of the materials produced in a subterranean well come from sand formations, the depletion of oil, gas or other materials from the sand leaves the sand formation permeable, allowing it to take in oil, gas or other resources exiting the well from fluid bearing strata below the depleted sand. Providing a composition that would seal depleted sands as well as act as an HPHT fluid loss control aid would provide a marked advantage for these drilling operations.

Lastly, HPHT fluid loss control aids that also will act as a wall cake conditioner would have an advantage in drilling operations. The condition of the filter cake determines the ability of the drill sting to be differently stuck to the borehole wall. A thinner and less permeable cake, which contains a lubricant, will be less likely to adhere to the drill pipe.

Although many compositions when added to a drilling fluid can provide the various advantages sought in a drilling operation, they can cause adverse effects on the flow properties of a mud, such as, altering thixotropic or dilatant flow properties. Excessive thixotropy causes the drilling mud to lose its viscous character at high sheer rates which can cause drill cuttings to settle to the bottom of the bore hole rather than moving upwards to be separated from the drilling fluid. Excessive dilatancy results in the setting up of the drilling fluid into an almost solid-like mass at high sheer rates and prevents movement of the drilling fluid out of the bore hole. Extremely thixotropic or dilatant drilling fluids interfere with successful operation, and the industry avoids additives that cause either problem. Lastly, because of high costs, the industry will not use many additives, even though effective to enhance or impart any of the foregoing characteristics to a drilling fluid.

Completion fluids comprise liquid materials used during the completion phase of a well such as perforating a productive formation and like. Completion fluids differ from drilling fluid in that they do not have to carry large quantities of cuttings upwardly in the annulus of the well bore, only relatively small amounts of cuttings such as cement, iron casing and rubber. Completion fluids therefore do not normally contain gelling agents and do not have to provide a great deal of lubrication because of considerably less friction between the inside of a casing and a work string as compared to a bore hole wall and a drill string.

Otherwise, completion fluids must have characteristics similar to drilling muds in that they cannot damage potentially productive formations and they also have to be sufficiently dense to offset pressures encountered at the bottom of the well hole especially in permeable formations and the like.

The foregoing shows that the improvement of the "native" muds involve the addition of other materials to the frilling fluids, but not without some side effects. Accordingly, it would be an advantage to provide a composition as well as a process that minimized or eliminated the foregoing difficulties encountered in additives to drilling fluids, especially HPHT fluid loss control aids.

SUMMARY OF INVENTION

Accordingly, the present invention comprises a composition, product produced by the process of forming the composition, as well as the product produced by introducing the composition/product by process into a drilling fluid, and a process that substantially obviates one or more of these and other problems due to the limitations and disadvantages of the related art.

The written description that follows set forth additional features and advantages of the invention and which practice of the invention will also reveal. The composition, product produced by the process, and the process of the invention avoid or minimize the foregoing difficulties and achieve other advantages as more particularly pointed out in the written description and the claims hereof.

To achieve these and other advantages, and in accordance with the purpose of the invention, as embodied and broadly described, the invention comprises a composition comprising an HPHT fluid loss control aid stable at elevated temperatures, and which also acts as an excellent shale stabilizer, bore hole lubricant sealant for depleted sands, and wall cake conditioner. The HPHT fluid loss control aid broadly comprises an uintaite sold under the trade name Gilsonite®, an asphaltic material or solidified hydrocarbon found only in Utah and Colorado and comprises one of the purest (9.9%) natural bitumens. The Gilsonite® employed according to the present invention also contains a surfactant, especially, anonionic surfactant. In addition, the HPHT fluid loss control aid also contains a solubilized lignite, such as a causticized lignite and carbon black. The combination of these compounds as a HPHT fluid loss control aid, reduces HPHT filtrate loss has good stability at elevated temperatures such as at about 300° F. and sometimes as high as 400° F., stabilizes troublesome shales and decreases bore hole erosion, helps seal depleted sands, reduces torque and drag, causes no adverse effects on the flow properties of the drilling fluid properly conditioned and lowers total well costs.

The invention also comprises a product made by combining the components of the composition as well as a product made by the process of adding the composition or product to a drilling fluid. Lastly, the invention comprises a process for controlling HPHT fluid loss in subterranean wells by adding the composition or product into a subterranean well.

Drilling fluids as used in the written description and the claims, include not only conventional drilling fluids or drilling muds including petroleum oil, synthetic oil and fresh water and salt water types as known in the art but also completion fluids and work over fluids. Subterranean wells, again as the written description and the claims employ this term, include oil wells, gas wells, geothermal wells, water wells, or any drilling of an opening in the earth by means of drilling equipment that relies on the introduction of drilling fluids into the bore hole in order to facilitate the drilling operation.

BRIEF DESCRIPTION OF DRAWINGS

A more complete appreciation of the present invention and many of the attendant advantages thereof will be readily understood by reference to the following description when considered in connection with the accompanying drawings in which.

Among the se benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

The present invention comprises as a composition of matter, a HPHT fluid loss control aid stable to high temperature such as 300° F. and in some instances as high as 400° F. The composition comprises a mixture of a uintaite such as Gilsonite® in combination with a solubilized lignite such as a causticized lignite and carbon black. The HPHT fluid loss control aid also comprises a product made by the process of combining the uintaite such as Gilsonite® solubilized lignites such as causticized lignite and carbon black with one another since in some instances the Gilsonite® and lignite might interact with one another and change the nature of the starting compounds. Additionally, the introduction of the composition of matter of the present invention into a drilling fluid could also alter the foregoing compounds used in the composition, and for this reason the invention also comprises a product produced by the process of combining the various compounds for the manufacture of the composition as well as a product produced by introducing the composition into a drilling fluid.

The invention also comprises a process for the control of HPHT fluid loss in subterranean wells by adding the composition or product produced by the process of forming the composition into a subterranean well.

An uintaite employed according to the present invention may comprise Gilsonite®, an asphaltic material or solidified hydrocarbon which may be found in Utah and Colorado, and may comprise one of the purest natural bitumens. Gilsonite® is a registered trademark of American Gilsonite® Co., Salt Lake City, Utah, which provides a variety of Gilsonite® "resins," sometimes identified by their softening points (ring and ball). General purpose (GP) Gilsonite® brand resin has a softening point of about 350° F., and Gilsonite® HM has a softening point of about 380° F., whereas Gilsonite® select 300 and select 325 have softening points of about 300° and Select 325 have softening points of about 300° F. and 325° F. respectively. The source vein that the Gilsonite® comes from primarily determines the softening points of these natural uintaite. Reference to uintaite or Gilsonite® resins as used in the written description and the claims includes these materials, especially as described in Kirk-Othmer *Encyclopedia of Chemical Technology*, $3^{rd}$ Ed. Vol. 11, 198C, pp.802–806 incorporated herein by reference. Gilsonite® resins used in drilling fluids according to the present invention may come from an area near Bonanza, Utah and have a specific gravity of about 1.05 with a softening point ranging from 370° to 400° F. although lower softening point Gilsonite® resins, i.e., those having a softening point of about 330° F., also finds use in the composition of the invention. Accordingly, the Gilsonite® resins employed in the invention have a softening point ranging from about 300° F. to about 400° F., especially from about 330° F. to about 400° F. and preferably from about 370° to about 400° F.

The Gilsonite® resins have a low acid value, zero iodine number, and will dissolve or partially dissolve in aromatic and aliphatic hydrocarbons, respectively. Part of the process of preparing Gilsonite® resins involves grinding so that approximately 99% pass through a 65-mesh Tyler screen with approximately 3% retained on a 100-mesh screen and 16% retained on a 200-mesh screen, non-cumulative.

The uintaite employed according to one aspect of the invention comprises Gilsonite® HM having a softening point of about 380°. Additionally, two or three component blends of Gilsonite® HM, Gilsonite® select 300 and Select 325 also find use in the invention, especially the to component blends. Anywhere from about 30 to about 70% by weight of the first Gilsonite® can be employed in the combination with anywhere from about 70% to about 30% by weight of the second or second and third Gilsonite®, and especially from about 65% to about 35% by weight of the first Gilsonite® to about 35% to about 65% by weight of the second or second and third Gilsonite®.

When employing a third Gilsonite®, the weight ratio of the second to the third Gilsonite® will vary from anywhere from about 1 to about 5 to about 5 to about 1 especially 1 to about 4 to about 4 to about 1 and preferably from about 1 to about 2 to about 2 to about 1. When the process of the invention employs a combination of Gilsonites®, it is especially preferred that the major component comprises a Gilsonite® having a softening point from about 370° F. to about 380° F., especially where the composition employs two component blends of Gilsonite®. In one embodiment, the two-component blend will amount to more than about 50% Gilsonite® having a softening point from about 370° to about 380° F.

The composition employs the uintaite or Gilsonite® in an amount from about 10% to about 70% by weight, especially from about 20% to about 60% by weight and preferably from about 45% to about 55% by weight of the HPHT fluid loss control aid of the present invention.

Additionally, in another embodiment of the present invention, the uintaite includes a surfactant. The surfactants in this regard comprise cationic, anionic, nonionic and amphoteric surfactants generally as described in *Kirk-Othmer Encyclopedia of Chemical Technology*, $3^{rd}$ Ed. Vol. 22, pp. 332–432 incorporated herein by reference. Especially preferred surfactants comprise nonionic surfactants, and particularly, strong lipophilic nonionic surfactants.

Especially preferred compounds in this regard comprise polyoxyalkylene glycol ether nonionic surfactants based on alkylene oxides having from 2 to about 4 carbon atoms. The surfactant is substantially within the molecular weight range of from about 1500 to about 4500 especially from about 2000 to about 41000 preferably from about 3000 to about 3900.

The polyoxyalkylene glycol ether nonionic water-soluble surfactants comprise polyoxyethylene glycol ether all-block, block-heteric, heteric-block or heteric-heteric block copolymers where the alkylene units have from 2 to 4 carbon atoms, i.e., those alkylene units based on alkylene oxides having from 2 to about 4 carbon atoms. The surfactants contain hydrophobic and hydrophilic blocks where each block is especially based on oxy-ethylene groups of oxypropylene groups or mixtures of these groups. The surfactant copolymers that may form during the manufacture of the surfactant, and also substantially free of starting materials and catalysts, if employed in the polymerization of the alkylene oxides used for manufacturing the surfactant.

Of the various polyether-polyol block-copolymers available, the preferred materials comprise polyoxyalkylene glycol ethers which in the case of surfactants contain hydrophobic and hydrophilic blocks, each block preferably being based on at least oxyethylene groups or oxypropylene groups or mixtures of these groups.

The most common method of obtaining these materials is by reacting an alkylene oxide such as ethylene oxide with a material that contains at least one reactive hydrogen. Alternative routes include the reaction of the active hydrogen material with a preformed polyglycol or the use of the ethylene chlorohydrin instead of an alkylene oxide.

The reacting active hydrogen material must contain at least one active hydrogen, preferably alcohols, and optionally acids, amides, mercaptans, alkyl phenols and the like. Primary amines may be used as well.

Especially preferred materials are those obtained by block polymerization techniques. By the careful control of monomer feed and reaction conditions, a series of compounds, e.g., surfactants can be prepared in which such characteristics as the hydrophile-lipophile balance (HLB), wetting and foaming power may be closely and reproducibly controlled. Surfactants generally employed on uintaite compounds generally have an HLB value of from about 1 to about 4 and especially from about 1 to below about 3. The chemical nature of the initial component employed in the formation of the initial polymer block generally determines the classification of the materials. The initial component does not have to be hydrophobic. In the case of surfactants, hydrophobicity will be derived from one of the two polymer blocks. The chemical nature of the initial component in the formation of the first polymer block generally determines the classification of the materials. Typical starting materials of initial components include monohydric alcohols such as methanol, ethanol, propanol, butanol and the like as well as dihydric materials such as glycol, glycerol, higher polyols, ethylene diamine and the like.

The various classes of materials, suitable for practice of this aspect of the present invention that are surfactants, have been described by Schmolka in "Nonionic Surfactants," Surfactant Science Series Vol. 2, Schick, M. J., Ed. Mercel Dekker, Inc., New York 1967, Chapter 10 which is incorporated herein by reference.

The first and simplest copolymer is that in which each block is homogeneous which is to say a single alkylene oxide is used in the monomer feed during each step in the preparation. These materials are referred to as all-block copolymers. The next classes are termed block-heteric and heteric-block, in which one portion of the molecule is composed of a single alkylene oxide while the other is a mixture of two or more such materials, one of which may be the same as that of the homogeneous block portion of the molecule. In the preparation of such materials, the hetero portion of the molecule will be totally random. The properties of these copolymers that in which both steps in the preparation of the different repeating units involve the addition of mixtures of alkylene oxides and is defined as a heteric-heteric block copolymer.

The block copolymer is typified by a monofunctional starting material such as a monohydric alcohol, acid, mercaptan, secondary amine or N-substituted amides. These materials can generally be illustrated by the following formula:

$$1-[A_m-B_n]_x \qquad [1]$$

where 1 is the starting material molecule as described before. The A portion is a repeating unit comprising and alkylene oxide unit in which at least one hydrogen can be replaced by an alkyl group or an aryl group, and m is the degree of polymerization which is usually greater than about 6. The B moiety is the other repeating unit such as oxyethylene with n again being the degree of polymerization. The value of x is the functionality of 1. Thus, where 1 is a monofunctional alcohol or amine, x is 1; where 1 is a polyfunctional starting material such as a diol (e.g., propylene glycol), x is 2 as is the case with the Pluronic® surfactants. Where ; is a tetrafunctional starting material such as ethylenediamine, x will be 4 as is the case with Tetronic® surfactants. Preferred copolymers of this type are the polyoxypropylene-polyoxyethylene block copolymers.

High molecular weight fatty weight alcohol such as lanolin alcohols and cholesterol comprise nonionic surfactants have HLB's below about 3. Other nonionic surfactants with these HLB ratings include ethoxylated polyoxypropylene glycols including Alkatronic® PGP 18-1 and PGP 33-1; ethoxylated amines from Tomah Products, Inc.; the Tetronic® copolymers of propylene oxide and ethylene oxide and Alkatronic® EDP 28-1 and EDP 38-1, which comprise ethoxylated ethylene diamine polyoxypropylene surfactants. Pluronic® also falls within the category of nonionic surfactants employed according to the present invention especially Pluronic® L-101, a nonionic surfactant based on a block copolymer of about 10 weight percent ethylene oxide and 90 weight percent propylene oxide, the copolymer terminated with ethylene oxide groups and primary hydroxyl groups. Pluronic® L-101 has an HLB of 1, and average molecular weight of about 3800, a viscosity of 800 cps at 25° C. and a pour point of minus 23° C. Pluronic® L-81 and L-61 also find use in the composition of the present invention. These surfactants also have 10 weight percent ethylene oxide and 90 weight percent propylene oxide in the polymer chain as does Pluronic® L-101; however, they have lower molecular weights, Pluronic® L-61 at a molecular weight of 2000 and Pluronic® L-81 at a molecular weight of 2700. Pluronic® L-10 1, however, is preferred.

Multifunctional starting materials may also be employed to prepare the homogeneous block copolymers.

In the block-heteric and heteric-block materials either A or B will be a mixture of oxides with the remaining block being a homogeneous block. Where the copolymer is a surfactant, one block will be the hydrophobe and the other the hydrophile and either of the two polymeric units will serve as the water solubilizing unit, and the other as the organophile, but the characteristics will differ depending on which is employed. Multifunctional starting materials can also be employed in materials of this type.

The heteric-heteric block copolymers are prepared essentially the same way as discussed previously with the major difference being that the monomer feed for the alkylene oxide in each step is composed of a mixture of two or more materials. The blocks will therefore be random copolymers of the monomer feed. In the case of surfactants, the solubility characteristics will be determined by the relative ratios of potentially water soluble and water insoluble materials.

These copolymers, as represented by formula (1) are prepared so that the weight ratio of A to B repeating units will also very from about 0.4:1 to about 2.5:1, especially from about 0.6:1 to about 1.8:1 and preferably from about 8.8:1 to about 1.2:1.

In one embodiment, these copolymers have the general formula:

$$RX(CH_2CH_2[CH_2]_yO)_nH \qquad (2)$$

where R is usually a typical surfactant hydrophobic group but may also be a polyether such as a polyoxyethylene group, a polyoxypropylene group, or a polyoxybutylene group, or a mixture of polyoxypropylene, polyoxyethylene and polyoxypropylene groups. In the above formula X is either oxygen or nitrogen or another functionality capable of linking the polyoxyalkylene chain to R, and y has a value of 0, 1, or 2. In most cases, n, the average number of alkylene oxide units must be greater than about 5 or about 6. This is especially the case where it is desired to impart sufficient water solubility to make the materials useful.

In one embodiment, these copolymers have the general formula:

$$RX(CH_2CH_2O)_nH \qquad (3)$$

where R is usually a typical surfactant hydrophobic group but may also be a polyether such as polyoxyethylene group, L polyoxypropylene group, or a polyoxybutylene group, or a mixture of these groups. In the above formula X is either oxygen or nitrogen or another functionality capable of linking the polyoxyethylene chain to R. In most cases, n, the average number of oxyethylene units in the oxyethylene group, must be greater than about 5 or about 6. This is especially the case where it is desired to impart sufficient water solubility to make the materials useful.

In a further embodiment, the preferred polyoxyalkylene glycol ethers are the nonionic polyether-polyol block-copolymers. However, other nonionic block-copolymers useful in the invention can be modified block copolymers using the following as starting materials: (a) alcohols, (B) fatty acids, (c) alkylphenol derivatives, (d) glycerol and its derivatives, (e) fatty amines, (f)-1,4-sorbitan derivatives, (g) castor oil and derivatives, and (h) glycol derivatives.

The surfactant employed comprises from about 0.25% to about 12% by weight and especially from about 1% to about 10% by weight and preferably from about 1.5% to about 5% by weight of the uintaite.

The composition of the invention also includes a lignite (sometimes referred to as "lignin") or "leonardite" compound all of which will be referred to hereafter as "lignite". Lignite is a variety of coal intermediate between peat and bituminous coal, the preferred lignite employed according to the present invention having an oxygen content of at least about 10 weight percent and usually in the range from about 10 weight percent to about 40 weight percent measured on a dry basis. Leonardite has an oxygen content generally higher than that of other types of lignite, usually from about 28 weight percent to about 29 weight percent oxygen as compared to about 10 weight percent oxygen in other lignites. Preferred lignites used in the composition of the invention contain from about 20 to about 40 weight percent oxygen. Leonardite has a higher oxygen content due to the larger number of carboxylic groups in the base composition which in some instances may explain the greater alkali solubility of leonardite as compared to other lignites. Leonardite is a soft, earthy medium brown, coal-like substance found in North Dakota, South Dakota, Montana and Texas. A typical leonardite is about 85% soluble in basic solutions as compared to about 68% solubility of conventional lignite.

The lignite employed according to the present invention comprises a solubilized lignite such as lignite treated with an excess of alkali such as sodium or potassium hydroxide solutions, preferably in the presence of a surfactant as described herein such as an anionic surfactant and optionally dried. The addition of anywhere from about 20% to about 33% of alkali based on the dry weight of lignin produces a causticized lignite especially suitable for the present invention. Equivalent solubilized lignites comprise the reaction of untreated lignite, causticized lignite, humic acid or a humic acid salt with an oleophilic amine, amine sale, quaternary ammonium salt, amide, amide-amine or nitrogen-containing hetrocyclic compound, especially one having an alkyl or alkenyl group of from about 12 to about 22 carbon atoms. U.S. Pat. No. 3,168,475 and U.S. Pat. No. 3,281,458 described lignites treated with a long-chain fatty acyl partial amides of a polyalkylene polyamine. U.S. Pat. Nos. 3,494, 865, 3,671,427 or 3,775,447 further describe these polyalkylene amines. Other solubilized lignite derivatives include those described in European Patent Application No. 00 49 484 and British Patent Application No. 2 117 431. All of the foregoing patents are incorporated herein by reference.

A specific type of lignite employed comprises lignite supplied by GEO Resources which obtains lignite from mines in Utah and Wyoming. The supplier adds sodium hydroxide to the lignite to raise the pH to a range from about 9 to about 10. The pH of the lignite, however, can vary anywhere from about 7.5 to about 13, especially from about 8 to about 12 and preferably from about 9 to about 11. The HPHT fluid loss control aid of the present invention, as a 19% by weight dispersion in water, also has a PH falling within the foregoing ranges. The composition of the invention includes solubilized lignites in an amount anywhere from about 10% to about 40% by weight, especially from about 15% to about 35% by weight and preferably from about 20% to about 30% by weight based on the total weight of the composition of the invention.

The composition of the invention also includes carbon black, especially carbon black produced by furnace processes and which have a size ranging from about 8 $m^2/gm$ to about $150M^2/gm$ as determined by the nitrogen adsorption method, or carbon black ranging in size from about 35 cc/100 gm to about 200 cc/100 gm as measured by DBP (dibutylphthalate) absorption. A preferred carbon black employed according to the present invention comprises carbon black in the particle size range of from about 70 to about 12 $m^2/gm$ as determined by the nitrogen adsorption method or about 75 to about 125 cc/100 gm as determined by the DBP (dibutylphthalate) absorption method.

The composition of the invention employs carbon black in an amount from about 10% to about 50% by weight, especially from about 15% to about 35% by weight and preferably from about 20% to about 30% by weight based on the weight of the composition.

The HPHT fluid loss control aid of the invention is employed in an amount anywhere from about 0.5 lb to about 10 lbs especially from about 1 lb to about 8 lbs and preferably from about 1.5 lbs to about 6 lbs per 42 gallon barrel of drilling fluid. The HPHT fluid loss control aid may also contain a so-called "weighting material" routinely employed in drilling fluids such as ground barite (barium sulphate), iron oxide, calcium carbonate, siderite, ilmenite, iron oxides and the like. In that event, the HPHT fluid loss control aid will be added to the drilling fluid in the foregoing amounts but discounting the added weighting material. A gallon of water weights 8.32 pounds per gallon (ppg.). Enough weighting material such as barite is added to this mud to make a gallon of the mud weight about 12.9 pounds. The mud weight is determined by the amount of formation pressure to the controlled.

EXAMPLES

Combining various uintaite compounds with solubilized lignite and carbon black as described herein produced HPHT fluid loss control aids having different properties depending on the formulation and the drilling fluid used in combination with the loss control aid.

Evaluation of the HPHT fluid loss control aids followed the procedures given in API Bulletin RP 13B-2 1990 which describes test results using the following abbreviations:

"PV" denotes plastic viscosity, reported in centipoises (cp);

"YP" refers to the yield point, measured in lb/100 $ft^2$, another viscosity characteristic of the drilling fluid;

"GELS" describe the suspending characteristics and the thixotropic properties of the drilling fluid.

"HTHP" relates to high temperature high pressure fluid losses measured at 200–350° F./500 psi differential and reported as ml/30 min.

Using the viscometer described in API Bulletin RP 13B-1, the viscosity of the mud is determined by taking readings at 600 RPM, 300 RPM, 200 RPM, 100 RPM, 6 RPM, 3 RPM. The following calculations are made to determine the Plastic Viscosity (PV and Yield Point (YP).

Plastic Viscosity=600 RPM Reading minus 300 RPM Reading=cP

Yield Point=300 RPM Reading minus Plastic Viscosity= lb/100 ft$^2$

Gel Strength readings are taken at 10 second, 10 minute, and 30 minutes intervals in the following manner: The viscometer is run at high speed for 10 seconds and then the mud remains static (undisturbed) for 10 seconds. At the end of the 10 seconds, record the maximum reading running the viscometer at 3 RPM. Repeat for the 10 minute and 30 minute gels. The gels are measured in units of lb/100 ft$^2$.

The foregoing examples with results summarized in Tables 1–4, show the addition of High Temp Plus® to the base mud in an amount based on "ppb," meaning pounds per 42 gallon barrel. These tables report the 3 rpm-600 readings in centipoise units. The composition of Tables 1–4, designated as high Temp Plus®, contained 50 weight percent treated Gilsonite® sold by American Gilsonite under the trade name "HM Pulverized" a surfactant treated uintaite. This HPHT fluid loss control aid also contained 25% by weight of causticized lignite obtained from GEO Resources, A Wyoming-type lignite, causticized to pH 9–10. The composition also contained 25% by weight carbon black as described herein. The components are dry blended.

Figure 1:
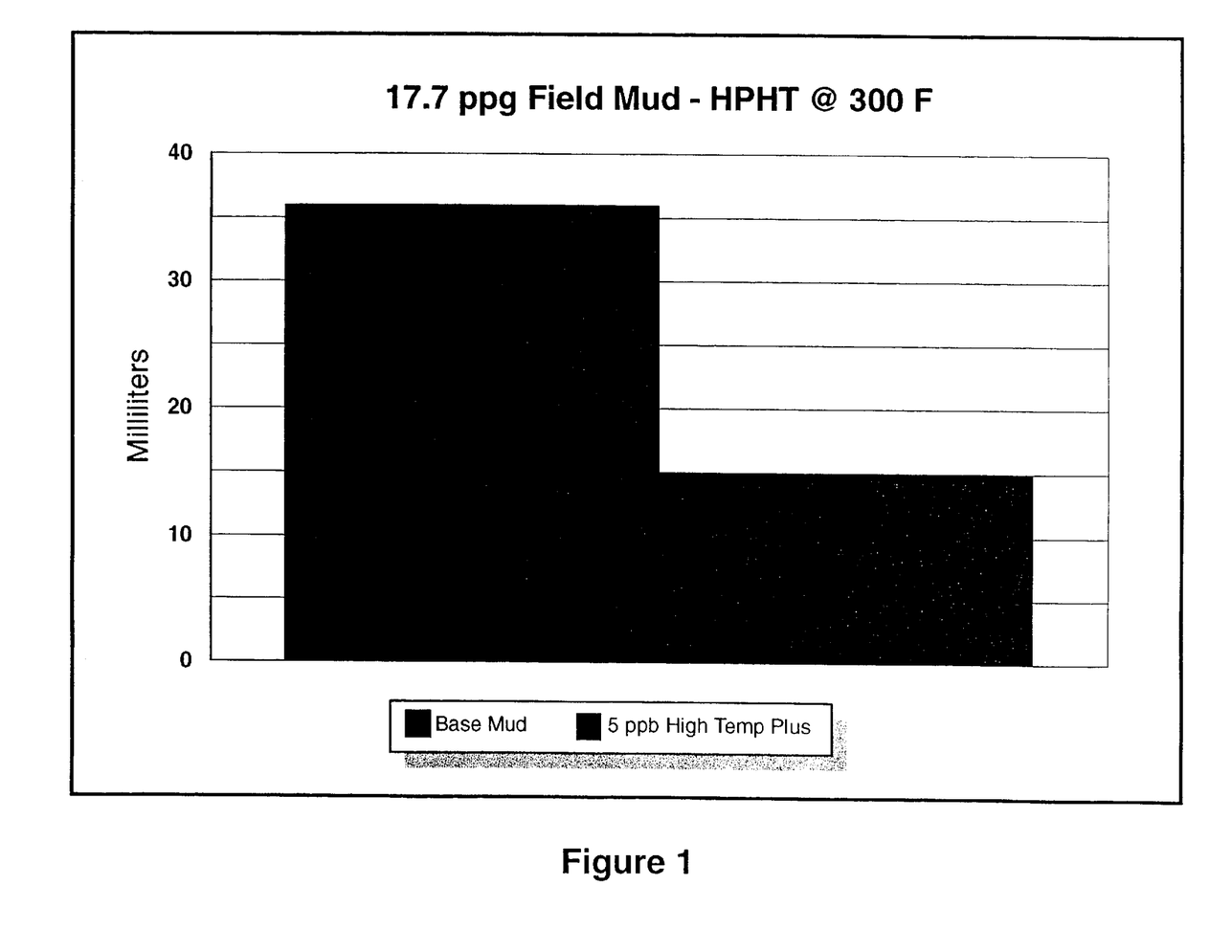
FIGS. 1–4 depict bar graphs illustrating the HPHT results of the composition of the present invention.
Figure 2:
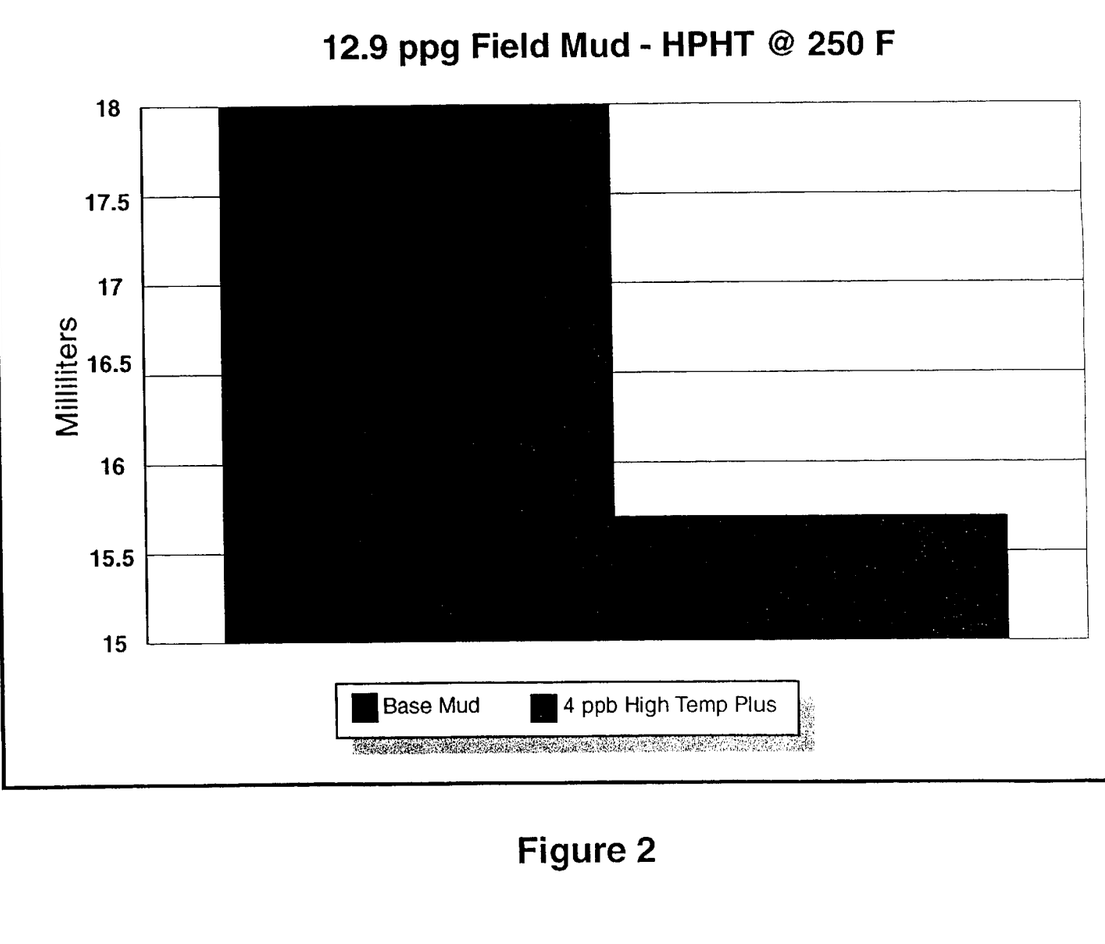
Figure 3:
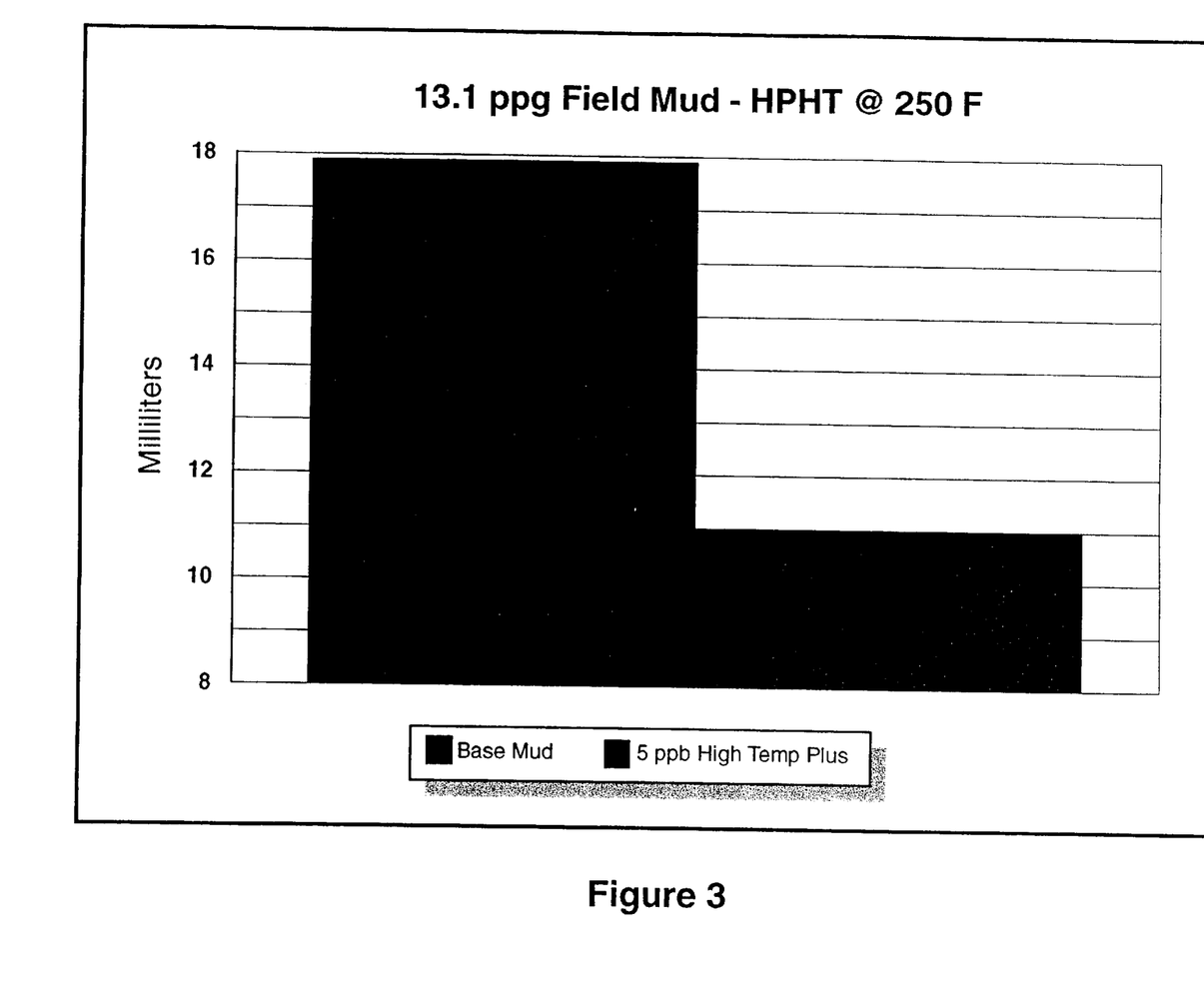
Figure 4:
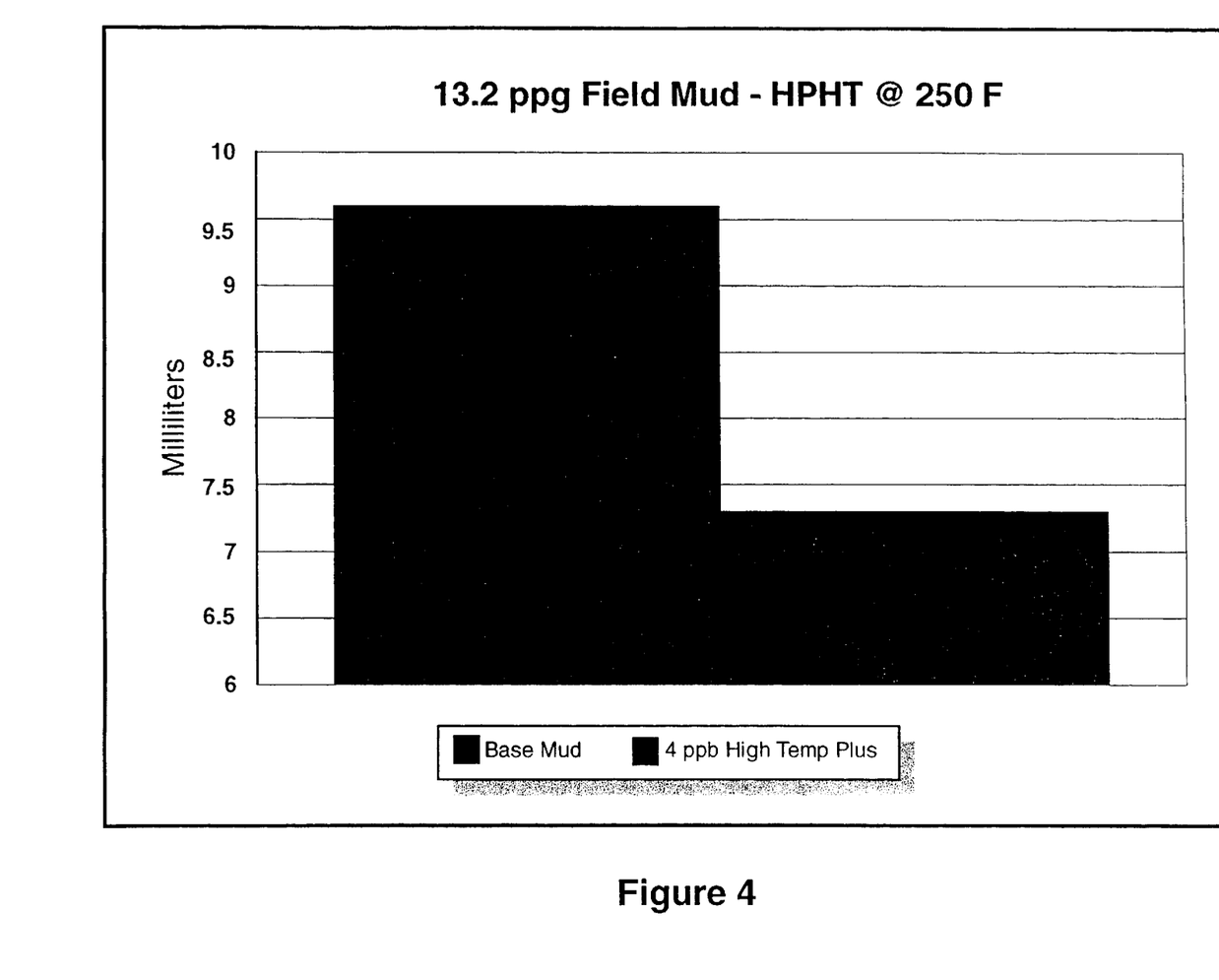

Tables 1–4 show the blends made according to this procedure and the tests performed in accordance with API Bulletin RP 13B-1, 1997. FIGS. 1–4 show the corresponding HPHT results for the compositions reported in Tables 1–4 respectively.

The Table 2 and Table 3 lubricity tests show lubricity data using an EP/Lubricity Tester (Part No. 111-00) following the manufacturer's procedure (OFI Testing Equipment, Inc.) with the exception of taking torque reading at 100, 200, 300, 400, 500 and 600 inch/pounds as soon as the readings stabilize.

TABLE 1

|  | Base Mud | Base Mud + 4 ppb High Temp Plus ® |
|---|---|---|
| Density | 17.7 |  |
| 600 rpm | 123 | 119 |
| 300 rpm | 69 | 69 |
| 200 rpm | 51 | 50 |
| 100 rpm | 31 | 30 |
| 6 rpm | 6 | 5 |
| 3 rpm | 5 | 5 |
| PV @ 120 F. | 54 | 50 |
| YP | 15 | 19 |
| Gels 10/10/30 | 8/67/84 | 7/48/60 |
| HPHT @ 300 F. | 37.4 | 15.0 |
| Cake Wt. gms | 128.6 | 74.9 |
| Cake Thickness | 27/32" | 16/32" |
| pH Meter | 11.5 | 11.3 |

TABLE 2

|  | Base Mud | Base Mud = 4 ppb High Temp Plus ® |
|---|---|---|
| Density | 12.9 |  |
| 600 rpm | 50 | 57 |
| 300 rpm | 28 | 33 |
| 200 rpm | 20 | 24 |
| 100 rpm | 11 | 15 |
| 6 rpm | 1 | 3 |
| 3 rpm | 1 | 3 |
| PV @ 120 F. | 22 | 24 |
| YP | 6 | 9 |
| Gels 10/10/30 | 2/12/26 | 2/22/31 |
| HPHT @ 300 F. | 18.0 | 15.8 |
| Cake Wt. gms | 23.2 | 19.6 |
| Cake Thickness | 7/32" | 5/32" |
| pH Meter | 9.6 |  |
| LUBRICITY TEST @ 60 RPM's | | |
| Coefficient of Friction of Water (0.32–0.36) = 0.33 | | |
| (Inch Pounds) | | |
| 100 | 16 | 13 |
| 150 | 25 | 19 |
| 200 | 32 | 24 |
| 300 | 48 | 34 |
| 400 | 62 | 45 |
| 500 | 74 | 52 |
| 600 | 85 | 62 |

TABLE 3

|  | Base Mud | Base Mud + 5 ppb High Temp Plus ® |
|---|---|---|
| Density | 13.1 |  |
| 600 rpm | 37 | 44 |
| 300 rpm | 22 | 27 |
| 200 rpm | 16 | 20 |
| 100 rpm | 10 | 13 |
| 6 rpm | 3 | 4 |
| 3 rpm | 2 | 3 |
| PV @ 120 F. | 15 | 17 |
| YP | 7 | 10 |
| Gels 10/10/30 | 2/7/7 | 3/8/10 |
| HPHT @ 250 F. | 17.8 | 11.0 |
| Cake Wt. gms | 26.4 | 20.9 |
| Cake Thickness | 8/32" | 6/32" |
| pH Meter | 9.7 |  |
| LUBRICITY TEST @ 60 RPM's | | |
| Coefficient of Friction of Water (0.32–0.36) = 0.35 | | |
| (Inch Pounds) | | |
| 100 | 14 | 12 |
| 150 | 21 | 18 |
| 200 | 27 | 23 |
| 300 | 40 | 32 |
| 400 | 56 | 44 |
| 500 | 68 | 55 |
| 600 | 80 | 72 |

Field Mud

TABLE 4

|  | Base Mud | Base Mud + 4 ppb High Temp Plus ® |
|---|---|---|
| Density | 13.2 |  |
| HPHT @ 250 f. | 9.6 | 7.2 |

The various numerical ranges describing the invention as set forth throughout the specification also include any combination of the lower ends of the ranges with the higher ends of the ranges set forth herein including, inter alia, ranges of concentrations of compounds, ratios of these compounds to one another, molecular weights, pH, temperatures, ratios of polymer units or polymer blocks to one another, average numbers of polymers blocks in the polymer compounds of the invention, and the like, as well as all whole number and/or fractional number values and ranges encompassed within these ranges.

It will be apparent to those skilled in the art that various modifications and variations can be made to the composition and process of the invention as well as the product made by combining the various compounds of the composition or combining the composition or product with a drilling fluid, without department from the spirit or scope of the invention. It is intended that these modifications and variations of this invention are to be included as part of the invention provide they come within the scope of the appended claims and their equivalents.

What is claimed is:

1. A HPHT fluid loss control aid composition comprising:
   an uintaite; a surfactant; a lignite; and a carbon black; wherein said lignite comprises a causticized lignite; and said lignite is in the amount from about 10% to about 40% by weight of said composition.

2. The composition of claim 1 where the pH of said composition is from about 7.5 to about 13.

3. The composition of claim 1 wherein said uintaite has a softening point from about 300° F. to about 400° F.; said uintaite in amount from about 30% to about 70% by weight of said composition and said surfactant in an amount from about 1% to about 10% by weight of said composition; and said carbon black in amount from about 10% to about 40% by weight of said composition.

4. A process of forming a HPHT fluid loss control aid composition comprising mixing:
   an uintaite in an amount from 30% to about 70% by weight of said composition and a surfactant in an amount from about 1% to about 10% by weight of said composition;
   a lignite in ;an amount from about 10% to about 40% by weight of said composition; and
   a carbon black in an amount from about 10% to about 40% by weight of said composition;
   where said lignite is a causticized lignite.

5. The process of claim 4 where the pH of said composition is from about 7.5 to about 13.

6. The process of claim 5 wherein said uintaite has a softening point from about 300° F. to about 400° F.

7. A product produced by the process of forming an HPHT fluid loss control aid composition comprising mixing:
   an uintaite in an amount from about 30% to about 70% by weight of said composition and a surfactant in an amount from about 1% to about 10% by weight of said composition;
   a lignite in an amount from about 10% to about 40% by weight of said composition; and
   a carbon black in an amount from about 10% to about 40% by weight of said composition;
   wherein said lignite is a causticized lignite.

8. A product produced by the process of claim 7 where the pH of said composition is from about 7.5 to about 13.

9. A product produced by the process of claim 7 wherein said uintaite has a softening point from about 300° F. about 400° F.

10. A method of controlling the HPHT fluid loss in a drilling fluid comprising adding to said fluid a HPHT fluid loss control aid composition comprising:
    an uintaite in an amount from about 30% to about 70% by weight of said composition and a surfactant in an amount from about 1% to about 10% by weight of said composition;
    a lignite in an amount from about 10% to about 40% by weight of said composition; and
    a carbon black in an amount from about 10% to about 40% by weight of said composition;
    wherein said lignite comprises a causticized lignite.

11. The method of claim 10 where the pH of said composition is from about 7.5 to about 13.

12. The method of claim 10 wherein said uintaite has a softening point from about 300° F. to about 400° F.

13. A product produced by the process of:
    (I) forming an HPHT fluid loss control aid composition comprising mixing:
      an uintaite in an amount from about 30% to about 70% by weight of said composition and a surfactant in an amount from about 1% to about 10% by weight of said composition;
      a lignite in an amount from about 10% to about 40% by weight of said composition; and
      a carbon black in an amount from about 10% to about 40% by weight of said composition; and
    (II) adding said HPHT fluid loss control aid composition to a drilling fluid; where said lignite is a causticized lignite.

14. A product produced by the process of claim 13 where the pH of said composition is from about 7.5 to about 13.

15. The product produced by the process of claim 13 wherein said uintaite has a softening point from about 300° F. to about 400° F.

* * * * *